US008560340B1

(12) United States Patent
Ringold

(10) Patent No.: US 8,560,340 B1
(45) Date of Patent: Oct. 15, 2013

(54) SYSTEMS AND METHODS FOR OVERRIDING REJECTIONS OF HEALTHCARE CLAIM TRANSACTIONS

(75) Inventor: James Morgan Ringold, Lawrenceville, GA (US)

(73) Assignee: McKesson Financial Holdings Limited (BM)

( * ) Notice: Subject to any disclaimer, the term of this patent is extended or adjusted under 35 U.S.C. 154(b) by 627 days.

(21) Appl. No.: 12/627,676

(22) Filed: Nov. 30, 2009

(51) Int. Cl.
G06Q 50/00 (2012.01)
G06Q 10/00 (2012.01)

(52) U.S. Cl.
USPC .................................................. 705/2; 705/3

(58) Field of Classification Search
USPC ............................................................ 705/2
See application file for complete search history.

(56) References Cited

U.S. PATENT DOCUMENTS

| | | | |
|---|---|---|---|
| 5,628,530 A | 5/1997 | Thornton | |
| 6,012,035 A | 1/2000 | Freeman et al. | |
| 6,757,898 B1 | 6/2004 | Ilsen et al. | |
| 6,769,228 B1 | 8/2004 | Mahar | |
| 7,155,397 B2 | 12/2006 | Alexander et al. | |
| 7,711,660 B1 | 5/2010 | Gentile et al. | |
| 2002/0002495 A1 | 1/2002 | Ullman | |
| 2002/0087583 A1 | 7/2002 | Morgan et al. | |
| 2002/0111832 A1 | 8/2002 | Judge | |
| 2002/0143582 A1* | 10/2002 | Neuman et al. | 705/3 |
| 2002/0198831 A1 | 12/2002 | Patricelli et al. | |
| 2003/0009367 A1 | 1/2003 | Morrison | |
| 2003/0050799 A1 | 3/2003 | Jay et al. | |
| 2003/0149625 A1 | 8/2003 | Leonardi et al. | |
| 2003/0154163 A1 | 8/2003 | Phillips et al. | |
| 2003/0229540 A1 | 12/2003 | Algiene | |
| 2004/0039599 A1 | 2/2004 | Fralic | |
| 2004/0059607 A1* | 3/2004 | Ball et al. | 705/3 |
| 2004/0073457 A1 | 4/2004 | Kalies | |
| 2004/0078234 A1 | 4/2004 | Tallal, Jr. | |

(Continued)

FOREIGN PATENT DOCUMENTS

| | | |
|---|---|---|
| CA | 2482370 | 3/2006 |
| WO | 9503569 | 2/1995 |
| WO | 0039737 | 7/2000 |
| WO | 2007025295 | 3/2007 |

OTHER PUBLICATIONS

The Journal of the South Carolina Medical Association, Aug. 2006, vol. 102, No. 7, p. 171-262.*

(Continued)

*Primary Examiner* — Tran Nguyen
(74) *Attorney, Agent, or Firm* — Sutherland Asbill & Brennan LLP

(57) ABSTRACT

Systems and methods are provided for overriding rejections of healthcare claim transactions. A healthcare claim transaction is received by a service provider from a healthcare provider computer and at least one edit is performed on the healthcare claim transaction. A rejection for the healthcare claim transaction is identified based at least in part on the at least one edit, and a message comprising an indication of the rejection is communicated to the healthcare provider computer. A reason for overriding the edit is received at an edit override web server from the healthcare provider computer, and override information for the rejection is generated based at least in part on the receipt of the override reason. The healthcare claim transaction is then reprocessed, and the generate override information is utilized to suppress the at least one edit during the reprocessing of the healthcare claim transaction.

19 Claims, 6 Drawing Sheets

(56) References Cited

U.S. PATENT DOCUMENTS

| | | |
|---|---|---|
| 2004/0078247 A1* | 4/2004 | Rowe et al. ............ 705/4 |
| 2004/0117323 A1 | 6/2004 | Mindala |
| 2004/0148198 A1 | 7/2004 | Kalies |
| 2004/0249745 A1 | 12/2004 | Baaren |
| 2005/0015280 A1 | 1/2005 | Gabel et al. |
| 2005/0060201 A1 | 3/2005 | Connely et al. |
| 2005/0102169 A1 | 5/2005 | Wilson |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240473 A1 | 10/2005 | Ayers |
| 2005/0288972 A1 | 12/2005 | Marvin et al. |
| 2006/0020514 A1 | 1/2006 | Yered |
| 2006/0026041 A1 | 2/2006 | Ullman et al. |
| 2006/0149784 A1 | 7/2006 | Tholl et al. |
| 2006/0184391 A1 | 8/2006 | Barre et al. |
| 2006/0259363 A1 | 11/2006 | Jhetam |
| 2007/0005402 A1 | 1/2007 | Kennedy et al. |
| 2007/0038484 A1* | 2/2007 | Hoffner et al. ............ 705/4 |
| 2007/0050209 A1 | 3/2007 | Yered |
| 2007/0136100 A1 | 6/2007 | Daugherty et al. |
| 2007/0162303 A1 | 7/2007 | Wiley et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2008/0040164 A1* | 2/2008 | Curtin et al. ............ 705/4 |
| 2008/0240401 A1 | 10/2008 | Mergen et al. |

OTHER PUBLICATIONS

Sampson, R.J., Taking Control of Health Care Costs, Best's Review—Life Health Insurance Edition, Nov. 1983, pp. 64-66, vol. 84, Issue 7, USA.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic: On-line Goes In-House, Chain Store Age Executive, Jan. 1987, pp. 128-32. vol. 63, Issue 1, USA.

Anonymous, TechRx Announces Successful Beta Deployment of T-Rex. PR Newswire. May 13, 2002.

Non-Final Office Action for U.S. Appl. No. 12/650,960 mailed Mar. 19, 2012.

Final Office Action for U.S. Appl. No. 12/650,960 mailed Aug. 30, 2012.

* cited by examiner

SYSTEMS AND METHODS FOR OVERRIDING REJECTIONS OF HEALTHCARE CLAIM TRANSACTIONS

FIELD OF THE INVENTION

Aspects of the invention relate generally to healthcare transactions, and more particularly, to overriding rejections of healthcare claim transactions that are triggered as a result of one or more edits performed on the healthcare claim transactions.

BACKGROUND OF THE INVENTION

Healthcare claim transactions, such as prescription claim requests, are often routed from a healthcare provider, such as a pharmacy or hospital, to a claims processor through a service provider system. Typically, when a healthcare transaction is received by the service provider system, the service provider system will perform one or more edits on the healthcare claim transaction. For example, edits that are specified by a healthcare provider chain, such as edits to ensure that the healthcare claim transaction is formatted properly and includes required information, may be performed. In certain circumstances, when a healthcare claim transaction is rejected as a result of an edit, the healthcare provider may wish to override the edit and, therefore, suppress the rejection.

There are several techniques that are utilized to override edits including a static override, a master override, and an algorithm based override. The first two techniques require the entry of a constant edit override code that may be known by an employee at the healthcare provider that is submitting the healthcare claim transaction. Because the first two techniques do not allow a healthcare provider to evaluate a reason for overriding the edit, many healthcare providers prefer an algorithm based override technique. With an algorithm based override, the employee typically contacts a help desk or call-in support center associated with the healthcare provider and explains the reasoning for the override. If the reasoning is sufficient, the employee is given an override code that is specific to the healthcare claim transaction, and the employee utilizes this override code to suppress the edit during a resubmission of the healthcare claim transaction. Although an algorithm based override technique allows a healthcare provider to evaluate override reasons, the implementation of a support center is undesirable because it often entails a relatively high expense and administrative cost. Additionally, the employee may incorrectly record a provided override code, thereby leading to additional administrative difficulties.

Therefore, a need exists for systems and methods for overriding rejections of healthcare claim transactions that are generated as a result of one or more edits performed on the healthcare claim transactions.

BRIEF DESCRIPTION OF THE INVENTION

Some or all of the above needs and/or problems may be addressed by certain embodiments of the invention. Embodiments of the invention may include systems, methods, and apparatus for overriding rejections of healthcare claim transactions. In one embodiment, a computer-implemented method for overriding a rejection of a healthcare claim transaction is provided. A healthcare claim transaction may be received from a healthcare provider computer, and at least one edit may be performed on the received healthcare claim transaction. A rejection that is generated for the healthcare claim transaction based at least in part on the performance of the at least one edit may be identified. A message including an indication that the healthcare claim transaction has been rejected as a result of the at least one edit may be communicated to the healthcare provider computer. A reason for overriding the rejection may be received from the healthcare provider computer at an edit override web server, and override information for the rejection may be generated based at least in part on receiving the reason. The healthcare claim transaction may be reprocessed, and the generated override information may be utilized to suppress the at least one edit during the reprocessing of the healthcare claim transaction. The operations of the method may be performed by one or more computers associated with a service provider.

In accordance with another embodiment of the invention, a system for processing healthcare claim transaction is provided. The system may include at least one memory and at least one processor. The at least one memory may be operable to store computer-executable instructions. The at least one processor may be configured to receive a healthcare claim transaction from a healthcare provider computer; perform at least one edit on the received healthcare claim transaction; identify a rejection for the healthcare claim transaction based at least in part on the performance of the at least one edit; communicate, to the healthcare provider computer, a message comprising an indication that the healthcare claim transaction has been rejected as a result of the at least one edit; receive, via an edit override web server from the healthcare provider computer, a reason for overriding the rejection; generate, based at least in part on the received reason, override information for the rejection; and reprocess the healthcare claim transaction, wherein the generated override information is utilized to suppress the at least one edit during the reprocessing of the healthcare claim transaction.

Additional systems, methods, apparatus, features, and aspects may be realized though the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention can provide systems, methods, apparatus, means, and/or mechanisms for overriding rejections of healthcare claim transactions. In certain embodiments, a web server may be provided that allows an individual associated with a healthcare provider (e.g., a pharmacist or pharmacy employee) to identify a reason for overriding a rejection of a healthcare claim transaction, such as a rejection that has been triggered by one or more edits conducted by a service provider that routes healthcare claim transactions between healthcare providers and claims processors.

In operation, a healthcare claim transaction may be received from a healthcare provider computer, and at least one edit may be performed on the received healthcare claim transaction. For example, any number of pre-edits may be performed on the healthcare claim transaction prior to routing the claim transaction to an appropriate claims processor computer. A rejection of the healthcare claim transaction may be generated by an edit and identified. A message including an indication that the healthcare claim transaction has been rejected as a result of an edit may be communicated to the healthcare provider computer. In certain embodiments, the message may further include instructions for the healthcare provider to access the edit override web server in order to provide a reason for overriding the edit. As desired, the message may include a link, such as a hypertext link, to the web server. The web server may be accessed by a healthcare provider employee utilizing the healthcare provider computer, and the web server may be utilized to provide a reason for overriding the rejection. Override information for the rejection may be generated based at least in part on receiving the reason. The healthcare claim transaction may then be reprocessed, and the generated override information may be utilized to suppress the at least one edit during the reprocessing of the healthcare claim transaction. In this regard, the administration of edit overrides may be conducted by the service provider utilizing the web server, thereby reducing the administrative and support cost of healthcare providers. For example, embodiments of the invention may eliminate the need for a healthcare provider chain to provide a support center for processing edit override requests.

System Overview

Figure 1:
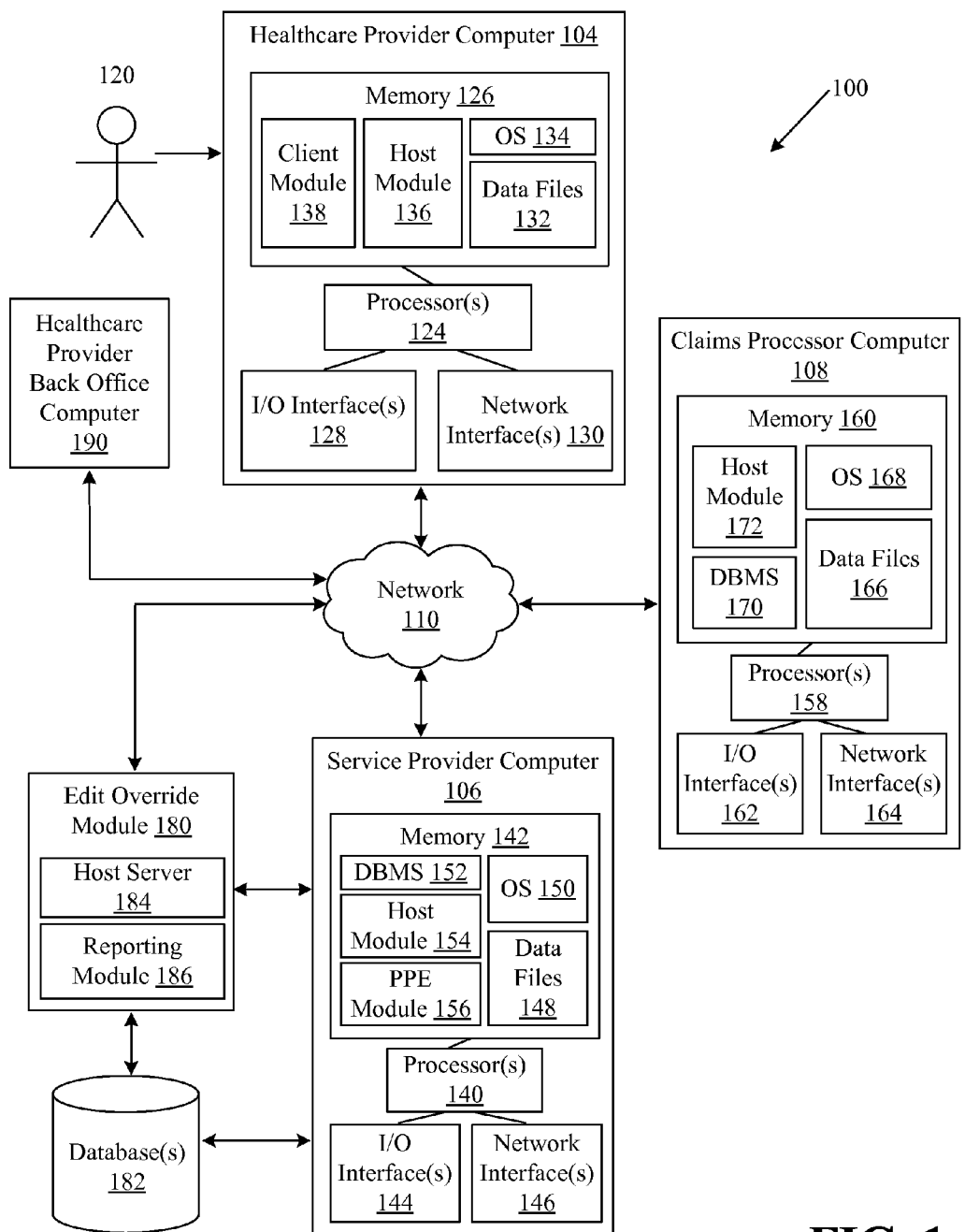
FIG. 1 illustrates an example overview of a system that facilitates the processing of healthcare claim transactions to override rejections that are generated by one or more edits performed on the healthcare claim transactions, according to an example embodiment of the invention.

An example system 100 for processing healthcare claim transactions to override rejections that are generated by one or more edits will now be described illustratively with respect to FIG. 1. As shown in FIG. 1, the system 100 may include at least one healthcare provider computer 104, at least one service provider computer 106, and at least one claims processor computer 108. As desired, each of the healthcare provider computer 104, service provider computer 106, and/or claims processor computer 108 may include one or more processing devices that may be configured for accessing and reading associated computer-readable media having stored thereon data and/or computer-executable instructions for implementing the various methods of the invention.

Additionally, in certain embodiments, the service provider computer 106 may include or otherwise be in communication with an edit override module 180 or edit override system, which may access and/or be in communication with one or more suitable data storage devices, 182. The edit override module 180 may include a suitable host server 184 component, such as a web server, that facilitates the receipt of reasons for overriding edit-based rejections from healthcare providers. For example, a healthcare provider computer 104 may be utilized by a healthcare employee 120 to access the host server 184 and enter or select a reason for overriding a rejection that has been triggered by an edit performed on a healthcare claim transaction. Once a reason has been received, the edit override module 180 may generate override information for the edit and/or the edit-based rejection. The generated override information may be utilized to suppress the edit and/or the edit-based rejection during a reprocessing of the healthcare claim transaction. In certain embodiments, the generated override information may be communicated by the edit override module 180 to the service provider computer 106 for use in suppressing the edit-based rejection; however, in other embodiments, the generated override information may be communicated to the healthcare provider computer 104 for use in a resubmission of the healthcare claim transaction.

Generally, network devices and systems, including one or more of the healthcare provider computer 104, service provider computer 106, and claims processor computer 108 may include or otherwise be associated with suitable hardware and/or software for transmitting and receiving data and/or computer-executable instructions over one or more communications links or networks. These network devices and systems may also include any number of processors for processing data and executing computer-executable instructions, as well as other internal and peripheral components that are well known in the art. Further, these network devices and systems may include or be in communication with any number of suitable memory devices operable to store data and/or computer-executable instructions. By executing computer-executable instructions, each of the network devices may form a special purpose computer or particular machine. As used herein, the term "computer-readable medium" describes any form of suitable memory or memory device.

As shown in FIG. 1, the healthcare provider computer 104, service provider computer 106, and claims processor computer 108 may be in communication with each other via one or more networks, such as network 110, which as described below can include one or more separate or shared private and public networks, including the Internet or a publicly switched telephone network. Each of these components—the healthcare provider computer 104, service provider computer 106, claims processor computer 108, and the network 110—will now be discussed in further detail.

The healthcare provider computer 104 may be associated with a healthcare provider, for example, a pharmacy, physician's office, hospital, etc. The healthcare provider computer 104 may be any suitable processor-driven device that facilitates the processing of healthcare requests made by patients or consumers and the communication of information associated with healthcare claim transactions to the service provider computer 106. Additionally, the healthcare provider computer 104 may be any suitable processor-driven device that facilitates communication with the host server 184. For example, the healthcare provider computer may include one or more server computers, mainframe computers, networked computers, desktop computers, personal computers, digital assistants, personal digital assistants, digital tablets, Internet appliances, application specific circuits, microcontrollers, minicomputers, and/or other processor-based devices. The execution of the computer-implemented instructions by the healthcare provider computer 104 may form a special purpose computer or other particular machine that is operable to facilitate the processing of healthcare requests made by patients and the communication of information associated with healthcare claim transactions to a service provider computer 106. The execution of the computer-implemented instructions by the healthcare provider computer 104 may also form a special purpose computer or other particular machine that is operable to communicate with the host server 184 in order to provide a reason for an edit override.

In certain embodiments, the healthcare provider computer 104 may be a suitable point of sale device associated with a healthcare provider. Additionally, in certain embodiments of the invention, the operations and/or control of the healthcare provider computer 104 may be distributed amongst several processing components, and the healthcare provider computer 104 may include a plurality of processor-driven devices. For example, a first device may be utilized to communicate healthcare claim transactions to the service provider computer 106 and a second device may be utilized to access the host server 184 in order to provide a reason for an edit override. For purposes of this disclosure, the term "healthcare provider computer" may refer to one processor-driven device or a plurality of processor-driven devices.

In addition to having one or more processors 124, the healthcare provider computer 104 may include one or more memory devices 126, one or more input/output ("I/O") interface(s) 128, and one or more network interface(s) 130. The memory devices 126 may be any suitable memory devices, for example, caches, read only memory devices, random access memory devices, magnetic storage devices, removable storage devices, etc. The memory devices 126 may store data, executable instructions, and/or various program modules utilized by the healthcare provider computer 104, for example, data files 132, an operating system 134, a web browser 136, and/or a client module 138. The data files 132 may include any suitable data that facilitates the receipt and/or processing of healthcare requests by the healthcare provider computer 104 and the generation and/or processing of healthcare claim transactions that are communicated to the service provider computer 106. For example, the data files 132 may include, but are not limited to, healthcare information, patient information, information associated with the service provider computer 106, information associated with one or more claims processors, information associated with one or more healthcare claim transactions, and/or information associated with one or more overrides of healthcare claim transaction rejections. The operating system (OS) 134 may be a suitable software module that controls the general operation of the healthcare provider 104. The OS 134 may also facilitate the execution of other software modules by the one or more processors 124, for example, the client module 138. The OS 134 may be, but is not limited to, Microsoft Windows®, Apple OSX™, Linux, Unix, or a mainframe operating system. The client module 138 may be a suitable software program, such as a dedicated program or Internet browser, that facilitates interacting with the service provider computer 106. For example, a user 120 such as a pharmacist or other pharmacy employee, may utilize the client module 138 in preparing and providing a healthcare claim request, such as a prescription claim transaction, to the service processor computer 106 for delivery to the appropriate claims processor computer 108 for adjudication or other coverage/benefits determination. The healthcare provider computer 104 may also utilize the client module 138 to retrieve or otherwise receive data, messages, or responses from the service provider computer 106 and/or other components of the system 100.

The web browser 136 may be any suitable software program, such as an Internet browser, that facilitates communication between the healthcare client computer 104 and the host server 184 of the edit override module 180. In this regard, a user 120 may identify a previously submitted healthcare claim transaction that has been rejected as a result of an edit performed by the service provider computer 106. The user 120 may then enter or select a reason for overriding an edit-based rejection of a healthcare claim transaction that was previously submitted to the service provider computer 106. Additionally, in certain embodiments, the web browser 136 may be utilized to receive override information that is generated by the edit override module 180. In certain embodiments, the web browser 136 and the client module 138 may be the same application.

In operation, the healthcare provider computer 104 may receive information associated with a healthcare request for a patient. As one example, the healthcare provider computer 104 may receive a healthcare request for a patient at a point of sale, such as in a pharmacy during a prescription fulfillment or purchase transaction. As another example, the healthcare provider computer 104 may electronically receive a healthcare request from a patient computer or other patient device. The healthcare provider computer 104 may generate a healthcare claim transaction for the request and information associated with the healthcare claim transaction may be communicated to the service provider computer 106. The service provider computer 106 may perform one or more pre-edits on the healthcare claim transaction and, if the claim is rejected as a result of a pre-edit, a message or other communication indicating the rejection may be communicated to the healthcare provider computer 104. The healthcare provider computer 104 may then be utilized to establish communication with the edit override module 180 in order to enter a reason for overriding the edit. In this regard, the healthcare claim transaction may be reprocessed and the edit-based rejection may be suppressed.

The one or more I/O interfaces 128 may facilitate communication between the healthcare provider computer 104 and one or more input/output devices, for example, one or more user interface devices, such as, a display, keypad, control panel, touch screen display, remote control, microphone, etc. that facilitate user interaction with the healthcare provider computer 104. For example, the one or more I/O interfaces 128 may facilitate entry of information associated with a healthcare transaction or healthcare claim request by an employee 120 of a healthcare provider, such as a pharmacy employee. The one or more network interfaces 130 may facilitate connection of the healthcare provider computer 104 to one or more suitable networks, for example, the network 110 illustrated in FIG. 1. In this regard, the healthcare provider computer 104 may receive and/or communicate information to other network components of the system 100, such as the service provider computer 106 and/or the edit override module 180.

With continued reference to FIG. 1, the service provider computer 106 may include, but is not limited to, any suitable processor-driven device that is configured for receiving, processing, and fulfilling requests from the healthcare provider computer 104 and/or claims processor computer 108 relating to prescription, pharmacy, benefits, and/or healthcare transactions and/or other activities. In certain embodiments, the service provider computer 106 may be a switch/router that routes healthcare claim transactions and/or other healthcare requests. For example, the service provider computer 106 may route billing requests and/or prescription claim requests communicated from the healthcare provider computer 104 to a claims processor computer 108, such as a pharmacy benefits manager (PBM), an insurer, a government payor, or a claims clearinghouse. In certain embodiments, the service provider computer 106 may include a suitable host server, host module, or other software that facilitates the receipt of a healthcare claim transaction from a healthcare provider computer 104 and/or the routing of the received healthcare claim transaction to a claims processor computer 108.

The service provider computer 106 may include any number of special purpose computers or other particular machines, application specific circuits, microcontrollers, personal computers, minicomputers, mainframe computers, servers, networked computers, and/or other processor driven devices. In certain embodiments, the operations of the service provider computer 106 may be controlled by computer-executed or computer-implemented instructions that are executed by one or more processors associated with the service provider computer 106 to form a special purpose computer or other particular machine that is operable to facilitate the receipt, routing, and/or processing of healthcare claim transactions. The one or more processors that control the operations of the service provider computer 106 may be incorporated into the service provider computer 106 and/or in communication with the service provider computer 106 via one or more suitable networks. In certain embodiments of the invention, the operations and/or control of the service provider computer 106 may be distributed amongst several processing components.

Similar to the healthcare provider computer 104, the service provider computer 106 may include one or more processors 140, one or more memory devices 142, one or more input/output ("I/O") interface(s) 144, and one or more network interfaces 146. The one or more memory devices 142 may be any suitable memory devices, for example, caches, read only memory devices, random access memory devices, magnetic storage devices, removable memory devices, etc. The one or more memory devices 142 may store data, executable instructions, and/or various program modules utilized by the service provider 106, for example, data files 148, an operating system ("OS") 150, the host module 154, a pre- and post-edit (PPE) module 156, and a database management system ("DBMS") 152 to facilitate management of data files 148 and other data stored in the memory devices 142 and/or one or more databases 182. The OS 150 may be, but is not limited to, Microsoft Windows®, Apple OSX™, Linux, Unix, or a mainframe operating system.

According to an embodiment of the invention, the data files 148 may store healthcare transaction records associated with communications received from various healthcare provider computers 104 and/or various claims processor computers 108. The data files 148 may also store any number of suitable routing tables that facilitate determining the destination of communications received from a healthcare provider computer 104 or claims processor computer 108. Additionally, in certain embodiments, the data files 148 may include override information associated with suppressing edits and/or edit-based rejections for various healthcare claim transactions. The host module 154 may receive, process, and respond to requests from the client module 138 of the healthcare provider computer 104, and may further receive, process, and respond to requests of the host module 172 of the claims processor computer 108.

The PPE module 156 may perform any number of pre-edits on a healthcare claim transaction prior to routing the healthcare claim transaction to a claims processor computer 108. Additionally, the PPE module 156 may perform any number of post-edits on an adjudicated reply that is received from a claims processor computer 108 for a healthcare claim transaction. According to an aspect of the invention, the PPE module 156 may perform at least one pre-edit on a healthcare claim transaction that results in a rejection of the healthcare claim transaction. The PPE module 156 may then communicate information associated with the rejection to the edit override module 180. Additionally, in certain embodiments, if override information is generated for the edit-based rejection, the override information may be stored in a memory that is accessible by the PPE module 156, and the override information may be utilized to suppress the edit and/or the edit-based rejection upon a reprocessing of the healthcare claim transaction.

The service provider computer 106 may include additional program modules for performing other processing methods described herein. Those of ordinary skill in the art will appreciate that the service provider computer 106 may include alternate and/or additional components, hardware or software without departing from example embodiments of the invention.

An edit override module 180 or edit override application may also be operative with the service provider computer 106. The edit override module 180 may include computer-executable instructions for receiving information associated with edit-based rejections of healthcare claim transactions, communicating or directing the communication of a message to the healthcare provider computer 104 indicating that the claim has been rejected, receiving a reason from the healthcare provider computer 104 for overriding the rejection, generating override information for the rejection, and/or communicating the generated override information to the healthcare provider computer 104 and/or the service provider computer 104. As shown in FIG. 1, the edit override module 180 may include a host server 184 and a reporting module 186. The host server 184 may be a suitable web server program that facilitates communication with the web browser 136 of the healthcare provider computer 104. The reporting module 186 may be a suitable software program that facilitates the generation of one or more reports associated with edit-based rejections and/or received reasons for overriding edit-based rejections.

In operation, when a healthcare claim transaction is rejected by an edit that is performed by the PPE module 156, information associated with the healthcare claim transaction and/or the edit-based rejection may be communicated to the edit override module 180. As desired, the edit override module 180 may store at least a portion of the received information in the data storage devices 182. A wide variety of information may be stored as desired in various embodiments of the invention, including but not limited to, identification information for the healthcare provider (e.g., a store identifier) and/or the healthcare provider computer 104, a primary care provider identifier (e.g., an NPI code), a prescription number or other identifier associated with the healthcare claim transaction, an identifier of an edit that triggered a rejection, a date of service, etc. The edit override module 180 may also generate a message that includes an indication that the healthcare claim transaction has been rejected as a result of the edit and/or an invitation to access the host server 184 in order to provide a reason for overriding the edit-based rejection. In certain embodiments, the message may include a link, such as a selectable hyperlink, that facilitates the establishment of a connection between the healthcare provider computer 104 and the host server 184. The edit override module 180 may communicate the generated message to the healthcare provider computer 104 or direct the communication of the generated message to the healthcare provider computer 104 by the service provider computer 106. In certain embodiments, the generated message may be communicated to the healthcare provider computer 104 as a response or reply to the submitted healthcare claim transaction. In other embodiments, the generated message may be appended to or communicated in addition to a rejection message that is generated by the service provider computer 106 and/or the PPE module 156.

The user 120 of the healthcare provider computer 104 may establish a communication session with the host server 184 of the edit override module 180. For example, the user 120 may utilize the web browser 136 of the healthcare provider computer 104 to navigate to an edit override web site associated with the host server 184. Once a communication session is established, the user 120 may identify a healthcare claim transaction that has been rejected by an edit. For example, the user 120 may provide information associated with a rejected healthcare claim transaction (e.g., a healthcare provider identifier, an NPI code, a prescription number, and/or a date of service) and the provided information may be compared to stored information associated with rejected healthcare claim transactions. If a match is found based at least in part on the comparison, then a rejected healthcare claim transaction may be identified. As another example, a list of rejected healthcare claim transactions that have been submitted by the healthcare provider computer 104 may be presented to the user 120 via a suitable web interface, and the user 120 may select a desired healthcare claim transaction. In certain embodiments, only healthcare claim transactions that have been rejected within a certain period of time, such as during the last five minutes, last ten minutes, etc., may be included in the provided list.

Once a rejected healthcare claim transaction has been identified, a prompt for a reason to override the edit-based rejection may be presented to the user 120, and the user 120 may enter an override reason utilizing a wide variety of suitable techniques. For example, the user 120 may enter an override reason into a text box or other field that is presented to the user 120. As another example, the user 120 may select an override reason from a drop down menu or other list of override reasons. The list of override reasons may include default override reasons and/or override reasons that are specific to the edit that triggered the rejection. Once an override reason has been entered by the user 120 and received by the host server 184, override information for the edit and/or the edit-based rejection may be generated. A wide variety of different types of override information may be generated as desired in various embodiments of the invention, for example, a numeric or alphanumeric override code. The generated override information may be utilized to suppress the edit and/or the edit-based rejection during a reprocessing of the healthcare claim transaction. The override information may be communicated to the PPE module 156 and/or the healthcare provider computer 104. If the override information is communicated to the PPE module 156, the PPE module 156 may utilize the override information to suppress the edit during a reprocessing of the healthcare claim transaction without the override information being entered by the user 120 of the healthcare provider computer 108. In this regard, data entry errors on the part of the user 120 during the entering override information may be reduced or avoided. Additionally, as desired in various embodiments of the invention, override information and/or information associated with the rejected healthcare claim transaction may be stored by the PPE module 156 and/or the service provider computer 106. Alternatively, the PPE module 156 and/or the service provider computer 106 may have access to the databases 182 associated with the edit override module 180.

In certain embodiments, a message may be communicated by the edit override module 180 or at the direction of the override module 180 to the healthcare provider computer 104, and the message may invite or instruct the user 120 to resubmit the rejected healthcare claim transaction. The override information may then be utilized with respect to the resubmitted healthcare claim transaction. In other embodiments, the service provider computer 106 may reprocess the healthcare claim transaction or a copy of the healthcare claim transaction that was previously submitted by the healthcare provider computer 104 and rejected. The override information may be utilized during the reprocessing of the healthcare claim transaction to suppress the edit and/or the edit-based rejection.

As desired in various embodiments of the invention, the edit override module 180 may store information associated with rejected healthcare claim transactions, the edits that generated the various rejections, received reasons for overriding the edits, an identity of the healthcare provider and/or user 120 that provided the reason, and/or generated override information. The reporting module 186 may then access at least a portion of the stored information and generate any number of reports associated with the information. For example, reports may be generated for particular healthcare providers and/or chains of healthcare providers that include information associated with edit overrides. A wide variety of different filters and/or sorting techniques may be utilized during the generation of reports. For example, data may be sorted based upon a date of service, a date of receiving a reason for an override, a date the claim was reprocessed, a range of service dates or override dates, a healthcare provider location, the types of edits, the reasons provided for overrides, etc. Additionally, a wide variety of preferences and/or parameters for generating reports may be receive and/or stored, such as healthcare provider preferences for generating reports. As one example, a daily or weekly report may be generated for a pharmacy chain that includes information associated with edit overrides that have been conducted by various locations of the chain. The reports may be utilized by the chain to track edits and/or reasons for overriding the edits in order to determine, for example, modifications that should be made for edits and/or improper procedural activities conducted by particular users 120 and/or at particular healthcare providers.

Generated reports may be communicated by the edit override module 180 or at the direction of the edit override module 180 to a wide variety of different entities as desired in various embodiments of the invention. For example, reports may be communicated to a healthcare provider computer 104 and/or a healthcare provider back office computer 190. The healthcare provider back office computer 190 may be associated with, for example, a central office. management office, or corporate office for a chain or group of healthcare providers (e.g., a pharmacy chain). The healthcare provider back office computer 190 may include components that are similar to the components of other networked devices shown in FIG. 1, such as the healthcare provider computer 104. For example, the healthcare provider back office computer 190 may be a processor driven device that includes at least one processor, at least one memory device, at least one I/O interface device, and/or at least one network interface device.

A wide variety of different techniques and/or software programs may be utilized to format a generated report. For example, a report may be formatted as a comma-separated-value (csv) file, as a spreadsheet file, as a word processor file, as a text file, etc. Additionally, a wide variety of different communication techniques may be utilized to communicate a report to the recipient, including but not limited to, email, short message service (SMS) messaging, other electronic communications, snail mail, etc. A report may be pushed to a recipient by the edit override module 180 or pulled from the edit override module 180 by a recipient submitting a request for one or more reports. Additionally, in certain embodiments, a report may be made available for download from an appropriate web site or server, such as a web site hosted by the host server 184.

The data storage devices 182 may be operable to store information associated with healthcare claim transactions, edit-based rejections, reasons for overriding edit-based rejections and/or generated override information. Additionally, in certain embodiments, the data storage devices 182 may store one or more preferences for generating reports and/or one or more generated reports. The data storage devices 182 may be accessible by the edit override module 180, the PPE module 156, and/or the service provider computer 106.

With continued reference to the service provider computer 106, the one or more I/O interfaces 144 may facilitate communication between the service provider computer 106 and one or more input/output devices, for example, one or more user interface devices, such as, a display, keypad, control panel, touch screen display, remote control, microphone, etc. that facilitate user interaction with the service provider computer 106. The one or more network interfaces 146 may facilitate connection of the service provider computer 106 to one or more suitable networks, for example, the network 110 illustrated in FIG. 1. In this regard, the service provider computer 106 may communicate with other components of the system 100.

With continued reference to FIG. 1, the claims processor computer 108 may be any suitable processor-driven device that facilitates receiving, processing, and/or fulfilling healthcare claim transactions and/or healthcare claim requests received from the service provider computer 106. For example, the claims processor computer 108 may be a processor-driven device associated with a pharmacy benefits manager (PBM), an insurer, a government payor, or a claims clearinghouse. As desired, the claims processor computer 108 may include any number of special purpose computers or other particular machines, application specific circuits, microcontrollers, personal computers, minicomputers, mainframe computers, servers, and the like. In certain embodiments, the operations of the claims processor computer 108 may be controlled by computer-executed or computer-implemented instructions that are executed by one or more processors associated with the claims processor computer 108 to form a special purpose computer or other particular machine that is operable to facilitate the receipt, processing, and/or fulfillment of healthcare claim transaction requests received from the service provider computer 106. The one or more processors that control the operations of the claims processor computer 108 may be incorporated into the claims processor computer 108 and/or in communication with the claims processor computer 108 via one or more suitable networks. In certain embodiments of the invention, the operations and/or control of the claims processor computer 108 may be distributed amongst several processing components.

Similar to other components of the system 100, the claims processor computer 108 may include one or more processors 158, one or more memory devices 160, one or more input/output ("I/O") interface(s) 162, and one or more network interfaces 164. The one or more memory devices 160 may be any suitable memory devices, for example, caches, read only memory devices, random access memory devices, magnetic storage devices, removable memory devices, etc. The one or more memory devices 160 may store data, executable instructions, and/or various program modules utilized by the claims processor computer 108, for example, data files 166, an operating system ("OS") 168, a database management system ("DBMS") 170, and a host module 172. The data files 166 may include any suitable information that is utilized by the claims processor computer 108 to process healthcare claim transactions, for example, patient profiles, patient insurance information, other information associated with a patient, information associated with a healthcare provider, etc. The operating system (OS) 168 may be a suitable software module that controls the general operation of the claims processor computer 108. The OS 168 may also facilitate the execution of other software modules by the one or more processors 158, for example, the DBMS 170 and/or the host module 172. The OS 150 may be, but is not limited to, Microsoft Windows®, Apple OSX™, Linux, Unix, or a mainframe operating system. The DBMS 170 may be a suitable software module that facilitates access and management of one or more databases that are utilized to store information that is utilized by the claims processor computer 108 in various embodiments of the invention. The host module 172 may initiate, receive, process, and/or respond to requests, such as healthcare claim transactions or claim requests, from the host module 154 of the service provider 106. The claims processor computer 108 may include additional program modules for performing other pre-processing or post-processing methods described herein. Those of ordinary skill in the art will appreciate that the claims processor 108 computer may include alternate and/or additional components, hardware or software without departing from example embodiments of the invention.

The one or more I/O interfaces 162 may facilitate communication between the claims processor computer 108 and one or more input/output devices, for example, one or more user interface devices, such as, a display, keypad, control panel, touch screen display, remote control, microphone, etc. that facilitate user interaction with the claims processor computer 108. The one or more network interfaces 164 may facilitate connection of the claims processor computer 108 to one or more suitable networks, for example, the network 110 illustrated in FIG. 1. In this regard, the claims processor computer 108 may receive healthcare claim transactions and/or other communications from the service provider computer 106, and the claims processor computer 108 may communicate information associated with processing claim transactions to the service provider.

The network 110 may include any telecommunication and/or data network, whether public, private, or a combination thereof, including a local area network, a wide area network, an intranet, an internet, the Internet, intermediate hand-held data transfer devices, and/or any combination thereof and may be wired and/or wireless. The network 110 may also allow for real-time, off-line, and/or batch transactions to be transmitted between or among the healthcare provider computer 104, the service provider computer 106, and the claims processor computer 108. Due to network connectivity, various methodologies as described herein may be practiced in the context of distributed computing environments. Although the service provider computer 106 is shown for simplicity as being in communication with the healthcare provider computer 104 or the claims processor computer 108 via one intervening network 110, it is to be understood that any other network configuration is possible. For example, intervening network 110 may include a plurality of networks, each with devices such as gateways and routers for providing connectivity between or among networks 110. Instead of or in addition to a network 110, dedicated communication links may be used to connect the various devices in accordance with an example embodiment of the invention. For example, the service provider computer 106 may form the basis of network 110 that interconnects the healthcare provider computer 104 and the claims processor computer 108.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. For example, in one embodiment, the service provider computer 106 (or other computer) may be implemented as a specialized processing machine that includes hardware and/or software for performing the methods described herein. In addition, at least a portion of the processor and/or processing capabilities of the service provider computer 106 and/or the edit override module 180, may be implemented as part of the claims processor computer 108. Accordingly, embodiments of the invention should not be construed as being limited to any particular operating environment, system architecture, or device configuration.

Operational Overview

Figure 2:
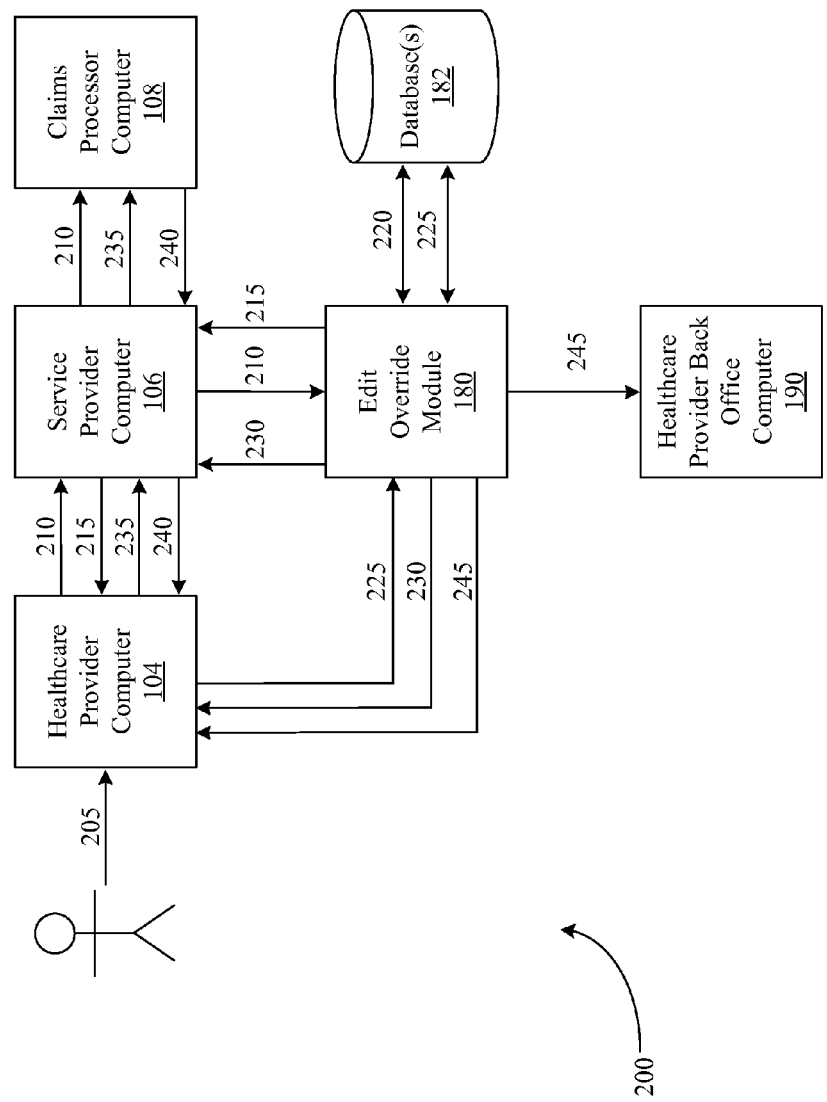
FIG. 2 is a diagram of one example data flow for processing a healthcare claim transaction that has been routed through a service provider and overriding a rejection of the healthcare claim transaction, according to an illustrative embodiment of the invention.

FIG. 2 is a diagram of one example data flow 200 for processing a healthcare claim transaction that has been routed through a service provider, such as the service provider computer 106 illustrated in FIG. 1, and overriding a rejection of the healthcare claim transaction, according to an illustrative embodiment of the invention. With reference to FIG. 2, a healthcare provider computer, such as the healthcare provider computer 104 illustrated in FIG. 1, may receive a healthcare request 205 from a patient. The healthcare request 205 may be received in-person or electronically as desired in various embodiments of the invention. For example, a patient may seek to fill a prescription for one or more drugs, medications, and/or other products at a pharmacy location or store. As another example, a patient may communicate a healthcare request 205 to a healthcare provider computer 104 via one or more suitable network connections. For example, a purchase request may be communicated to a healthcare provider computer 104 from a customer computer or customer device via a web portal hosted by the healthcare provider computer 104.

The healthcare provider computer 104 may receive and process the request 205 to generate a healthcare claim transaction 210, such as a healthcare claim request or a prescription claim request, and the healthcare claim transaction 210 may be communicated by the healthcare provider computer 104 to the service provider computer 106. According to an example embodiment of the invention, the healthcare claim transaction 210 may be in accordance with a version of a National Council for Prescription Drug Programs (NCPDP) Telecommunication Standard, although other standards may be utilized as well. As desired, the healthcare claim transaction 210 may include a Banking Identification Number (BIN) and/or a Processor Control Number (PCN) for identifying a particular claims processor computer, such as the claims processor computer 108 illustrated in FIG. 1, as a destination for the healthcare claim transaction 210. In addition, the healthcare claim transaction 210 may also include information relating to the patient, payor, prescriber, healthcare provider, and/or the prescribed drug or product. As an example, the healthcare claim transaction 210 received by the service provider computer 106 may include one or more of the following information:

Payor ID/Routing Information
    BIN Number (i.e. Banking Identification Number) and/or Processor Control Number (PCN) that designates a destination of the healthcare claim transaction 210
Patient Information
    Name (e.g., Patient Last Name, Patient First Name, etc.)
    Date of Birth of Patient
    Age of Patient
    Gender
    Patient Address (e.g., Street Address, Zip Code, etc.)
    Patient ID or other identifier
Insurance/Coverage Information
    Cardholder Name (e.g., Cardholder First Name, Cardholder Last Name)
    Cardholder ID and/or other identifier (e.g., person code)
    Group ID and/or Group Information
Prescriber Information
    Primary Care Provider ID or other identifier (e.g., NPI code)
    Primary Care Provider Name (e.g., Last Name, First Name)
    Prescriber ID or other identifier (e.g., NPI code, DEA number)
    Prescriber Name (e.g., Last Name, First Name)
    Prescriber Contact Information (e.g., Telephone Number)
    Pharmacy or other Healthcare Provider Information (e.g., store name, chain identifier, etc.)
    Pharmacy or other Healthcare Provider ID (e.g., National Provider Identifier (NPI) code)
Claim Information
    Drug or product information (e.g., National Drug Code (NDC))
    Prescription/Service Reference Number
    Date Prescription Written
    Quantity Dispensed
    Number of Days Supply
    Diagnosis/Condition
    Pricing information for the drug or product (e.g., network price, Usual & Customary price)
    One or more NCPDP Message Fields
Date of Service.

The service provider computer 106 may receive the healthcare claim transaction 210 from the healthcare provider computer 104, and the service provider computer may process the healthcare claim transaction 210. As desired, the service provider computer 106 may perform one or more pre-edits on the healthcare claim transaction 210. The pre-edits may add and/or edit information included in the healthcare claim transaction 210 prior to the healthcare claim transaction 210 being communicated to an appropriate claims processor computer 108. Pre-edits may include default pre-edits and/or pre-edits specified by a healthcare provider or group of healthcare providers (e.g., a pharmacy chain). In certain embodiments, a pre-edit may be performed that results in a rejection of the healthcare claim transaction 210. A wide variety of different pre-edits may result in a rejection, including but not limited to, an improper physician identifier, an invalid use of a brand name product, missing or invalid date of birth or other patient information, etc. Additionally, in certain embodiments, the service provider computer 106 may generated a message 215 indicating that the healthcare claim transaction 210 has been rejected by a pre-edit and communicate the generated message 215 to the healthcare provider computer 104.

If a pre-edit triggers a rejection of the healthcare claim transaction 210, the healthcare claim transaction 210, a copy of the healthcare claim transaction 210, and/or information included in the healthcare claim transaction 210 may be communicated by the service provider computer 106 to an edit override module, such as the edit override module 180 illustrated in FIG. 1. The edit override module 180 may process the rejected healthcare claim transaction 210 and, as desired, store information 220 associated with the rejected healthcare claim transaction 210 in one or more suitable databases, such as the databases 182 illustrated in FIG. 1. A wide variety of information 220 may be stored as desired, such as a copy of the healthcare claim transaction 210, various information extracted from the healthcare claim transaction 210 (e.g., a primary care provider identifier, an identifier of the healthcare provider, an NPI code, a prescription number, a date of service, etc.), an identifier of the edit that triggered the rejection, and/or information associated with the rejection. The edit override module 180 may generate a message 215 that includes an invitation for a user of the healthcare provider computer 104 to access a web server associated with the edit override module 180 in order to enter a reason for overriding the edit-based rejection. In certain embodiments, the generated message 215 may include a link, such as a selectable hypertext link, that facilitates the establishment of a communications session with the web server. As desired, the generated message 215 may also include an indication that the healthcare claim transaction 210 has been rejected by an edit. In certain embodiments, the generated message 215 may be communicated by the edit override module 180 directly to the healthcare provider computer 104. In other embodiments, the edit override module 180 may direct the service provider computer 106 to communicate the generated message 215 to the healthcare provider computer 104. Additionally, in certain embodiments, a message generated by the edit override module 180 may be appended to a message generated by the service provider computer 106 (e.g., a rejection message). In other embodiments, multiple messages may be communicated to the healthcare provider computer. For purposes of this disclosure, a single message 215 will be referred to.

The healthcare provider computer 104 may establish a communications session with the edit override module 180. In certain embodiments, a secure communications session may be established. A user of the healthcare provider computer 104 may be prompted to submit log-in and/or security information to the edit override module 180 in order to establish a secure communications session. Once a communications session has been established, the user of the healthcare provider computer 104 may identify the rejected healthcare claim transaction 210, for example, by selecting the healthcare claim transaction 210 from a list or providing information associated with the healthcare claim transaction 210 (e.g., an NPI code, a prescription number, a date of service, etc.) to the edit override module 180 that can be compared to at least a portion of the stored information 220. Once the healthcare claim transaction 210 is identified, the user may be prompted to enter or select a reason for overriding the edit or the edit-based rejection. An override reason 225 or a selection of an override reason 225 may be received by the edit override module 180 from the healthcare provider computer 104 and, as desired, the override reason 225 may be stored in the databases 182 in association with the other stored information 220 associated with the healthcare claim transaction 210. In certain embodiments, the edit override module 180 may perform a validation procedure on the override reason 225 and/or seek approval of the override reason 225. For example, certain override reasons may be submitted to a central system associated with a healthcare provider chain for approval.

Once an override reason 225 has been received and, if desired, validated and/or approved, edit override information 230 may be generated by the edit override module 180. The edit override information 230 may be utilized to suppress the edit and/or the edit-based rejection during a reprocessing of the healthcare claim transaction 210. A wide variety of different types of edit override information 230 may be generated as desired in various embodiments of the invention, for example, an edit override code that is specific the healthcare claim transaction 210. The generated edit override information 230 may communicated by the edit override module 180 to the service provider computer 106 and/or to the healthcare provider computer 104.

According to an aspect of the invention, the healthcare claim transaction 210 may be reprocessed subsequent to the generation of the edit override information 230. In certain embodiments, the edit override module 180 may instruct the service provider computer 106 to reprocess the previously submitted healthcare claim transaction 210. During the reprocessing, the edit override information 230 may be utilized to either suppress the edit that generated the previous rejection or, alternatively, to override a rejection that is generated when the edit is performed on the reprocessed healthcare claim transaction 210. When the edit override information 230 is provided by the edit override module 180 to the service provider computer 106, the edit-based rejection is automatically suppressed without having to receive edit override information 230 from the healthcare provider computer 104. The reprocessed healthcare claim transaction 210 may communicated by the service provider computer 106 to the appropriate claims processor computer 108 for adjudication.

In other embodiments of the invention, a message may be communicated by the edit override module 180 or at the direction of the edit override module 180 to the healthcare provider computer 104 instructing a user of the healthcare provider computer 104 to resubmit the healthcare claim transaction 210. In embodiments in which edit override information 230 is communicated to the healthcare provider computer 104, the message may be communicated along with edit override information 230. A copy 235 of the rejected healthcare claim transaction 210 may then be communicated by the healthcare provider computer 104 to the service provider computer 106 for processing. The service provider computer 106 may process the new healthcare claim transaction 235 in a similar manner as the previous healthcare claim transaction 210 and one or more edits may be performed on the new transaction 235. However, during the processing of the new transaction 235, the edit override information 230 may be utilized to either suppress the edit that generated the previous rejection or, alternatively, to override a rejection that is generated when the edit is performed on the reprocessed healthcare claim transaction 210. When the edit override information 230 is provided by the edit override module 180 to the service provider computer 106, the edit-based rejection is automatically suppressed without having to receive edit override information 230 from the healthcare provider computer 104. Alternatively, the edit override information 230 may be provided to the service provider computer 106 from the healthcare provider computer 104 either along with the submission of the new transaction 235 or in response to a rejection that is generated by the edit during the processing of the new transaction 235. The new claim transaction 235 may then be communicated by the service provider computer 106 to the appropriate claims processor computer 108 for adjudication.

According to an example embodiment, the service provider 106 may utilize at least a portion of the information included in the healthcare claim transaction 210 or new transaction 235, such as a BIN/PCN, to determine the appropriate claims processor computer 108 to route the healthcare claim transaction 210, 235 to. The service provider computer 106 may also include a routing table, perhaps stored in memory, for determining which claims processor computer 108 to route the healthcare claim transaction 210, 235 to.

The claims processor computer 108 may receive and adjudicate or otherwise process the healthcare claim transaction 210 or the new transaction 235. For example, the claims processor computer 108 may determine benefits coverage for the healthcare claim transaction 210 or the new transaction 235 according to an adjudication process associated with eligibility, pricing, and/or utilization review. The claims processor computer 108 may transmit an adjudicated reply 240 for the healthcare claim transaction 210 or the new transaction 235 to the service provider computer 106. The service provider computer 106 may receive the adjudicated reply 240 from the claims processor computer 108. As desired, the service provider computer 106 may perform any number of post-edits on the adjudicated reply 240. The adjudicated reply 240 may then by routed or otherwise communicated by the service provider computer 106 to the healthcare provider computer 104.

Additionally, in certain embodiments of the invention, the edit override module 180 may generate one or more reports 245 associated with edit overrides, as described in greater detail above with reference to FIG. 1. Generated reports 245 may be communicated to a wide variety of other systems or devices as desired in various embodiments of the invention, for example, to the healthcare provider computer 104 and/or to a healthcare provider back office computer, such as the healthcare provider back office computer 190 illustrated in FIG. 1.

Figure 3:
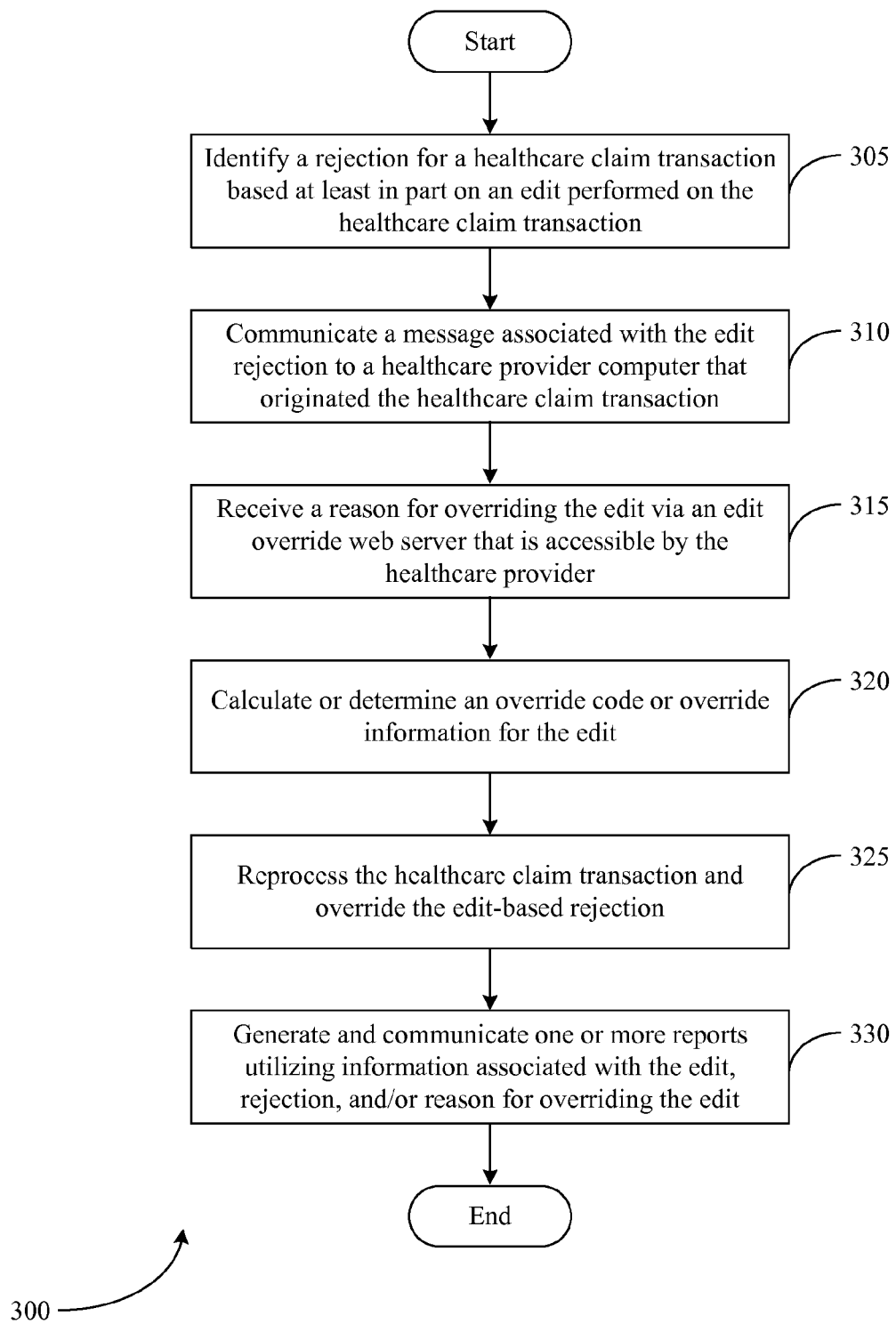
FIG. 3 is a flow chart of an example method for processing a healthcare claim transaction and overriding a rejection that is generated by an edit performed on the healthcare claim transaction, according to an illustrative embodiment of the invention.

As described herein, healthcare transactions may be examined as they are routed to or through a service provider computer 106. In this regard, edit-based errors may be identified and processed by the service provider computer 106 and/or the edit override module 180 in real time or near real time as the healthcare transactions are routed to or through the service provider computer 106. FIG. 3 is a flow chart of an example method 300 for processing a healthcare claim transaction and overriding a rejection that is generated by an edit performed on the healthcare claim transaction, according to an illustrative embodiment of the invention. The method 300 may be performed by a suitable service provider computer and/or an associated edit override module, such as the service provider computer 106 and edit override module 180 illustrated in FIG. 1. The method 300 may begin at block 305.

At block 305, a rejection for a healthcare claim transaction that is triggered by at least one edit, such as a pre-edit, that is performed on the healthcare claim transaction may be identified. For example, a healthcare claim transaction may be received by the service provider computer 106 from a healthcare provider computer, such as the healthcare provider computer 104 illustrated in FIG. 1. The service provider computer 104 may perform one or more pre-edits on the healthcare claim transaction, and at least one pre-edit may generate or trigger a rejection of the healthcare claim transaction. An example of the operations that may be performed at block 305 is described in greater detail below with reference to FIG. 4.

At block 310, a message associated with the edit-based rejection may be communicated to the healthcare provider computer 104 that originated the healthcare claim transaction. For example, a message may be generated as a result of identifying the rejection, and the message may be communicated to the healthcare provider computer 104 by the service provider computer 106 or the edit override module 180. In certain embodiments, the message may include an invitation to access an edit override web server, such as the web server 184 illustrated in FIG. 1, in order to provide a reason for overriding the edit and/or the edit-based rejection. The message may include a web address or universal resource locator (URL) associated with at least one web page hosted by the edit override web server 184. Additionally, in certain embodiments, the message may include a link, such as a selectable hypertext link, that facilitates the establishment of a communications session with the edit override web server 184.

At block 315, a reason for overriding the edit and/or the edit-based rejection may be received from the healthcare provider computer 104 by the edit override web server 184. For example, a user of the healthcare provider computer 104 may log onto the edit override web server 184, identify a previously rejected healthcare claim transaction, and provide a reason for overriding an edit or edit-based rejection associated with the healthcare claim transaction. An example of the operations that may be performed at block 315 is described in greater detail below with reference to FIG. 5.

At block 320, override information, such as an override code, may be generated by the edit override module 180 subsequent to the receipt of an override reason. The generated override information may be communicated by the edit override module 180 to the service provider computer 106 and/or to the healthcare provider computer 104 as desired. During the reprocessing of the healthcare claim transaction at block 325, the generated override information may be utilized to suppress the edit and/or the edit-based rejection. For example, the original healthcare claim transaction may be reprocessed or the healthcare provider computer may resubmit the healthcare claim transaction in order to have the healthcare claim transaction reprocessed. During the reprocessing of the healthcare claim transaction, the edit may be either bypassed or suppressed by the edit override information or, alternatively, the a rejection generated by the edit may be suppressed or overridden by the edit override information. In this regard, the healthcare claim transaction may be successfully processed by the service provider computer 106 and routed to an appropriate claims processor computer for adjudication, such as the claims processor computer 108 illustrated in FIG. 1. An example of the operations that may be performed at block 325 to reprocess the healthcare claim transaction and override the edit-based rejection is described in greater detail below with reference to FIG. 6.

At block 330, which may be optional in various embodiments of the invention, one or more reports may be generated utilizing information associated with the healthcare claim transaction, the edit, the edit-based rejection, and/or the reason for overriding the edit. The generated one or more reports may then be communicated as desired to the healthcare provider computer 104 and/or a healthcare provider back end computer, such as the healthcare provider back end computer 190 illustrated in FIG. 1.

The method 300 may end following block 330.

Figure 4:
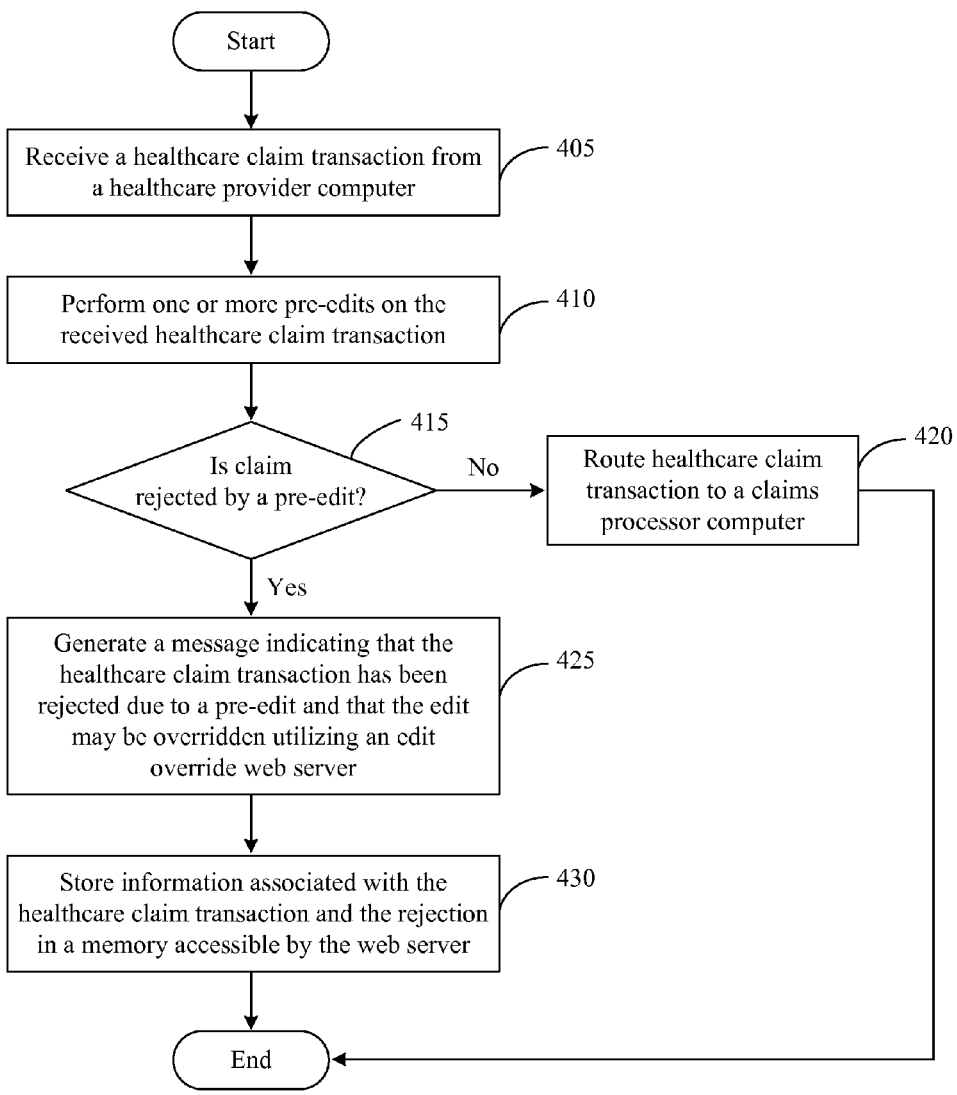
FIG. 4 is a flow chart of an example method for processing a rejection of a healthcare claim transaction, according to an illustrative embodiment of the invention.

FIG. 4 is a flow chart of an example method 400 for processing a rejection of a healthcare claim transaction, according to an illustrative embodiment of the invention. The method 400 illustrated in FIG. 4 may be an example implementation of block 305 shown in FIG. 3. As such, the method 400 may be performed by a suitable service provider computer and/or edit override module, such as the service provider computer 106 and/or edit override module 180 illustrated in FIG. 1. The method 400 may begin at block 405.

At block 405, a healthcare claim transaction may be received by the service provider computer 106 from a healthcare provider computer, such as the healthcare provider computer 104 illustrated in FIG. 1. One or more pre-edits may be performed on the received healthcare claim transaction by the service provider computer 106 at block 410. For example, a PPE module associated with the service provider computer 106, such as the PPE module 156 shown in FIG. 1, may perform one or more pre-edits on the healthcare claim transaction.

At block 415, a determination may be made as to whether the healthcare claim transaction has been rejected by a pre-edit that was performed on the healthcare claim transaction. Additionally, at block 415, a determination may be made as to whether a rejecting edit may be overridden. If it is determined at block 415 that the healthcare claim transaction has not been rejected by any pre-edits, then operations may continue at block 420, and the healthcare claim transaction may be routed to an appropriate claims processor computer for adjudication, such as the claims processor computer 108 illustrated in FIG. 1. If it is determined at block 415 that the healthcare claim transaction has been rejected by an edit that cannot be overridden, then a rejection for the healthcare claim transaction may be communicated to the healthcare provider computer 104. If, however, it is determined at block 415 that the healthcare claim rejection has been rejected by a pre-edit that can be overridden, then operations may continue at block 425.

At block 425, a message indicating that the healthcare claim transaction has been rejected due to a pre-edit may be generated. As desired, the message may include an indication that the edit may be overridden by accessing and utilizing an edit override web server, such as the web server 184 illustrated in FIG. 1. The generated message may include an invitation to access the web server 184 and, in some embodiments, a link to the web server 184. At block 430, information associated with the healthcare claim transaction, the edit, and/or the rejection may be stored in at least one memory that is accessible by the edit override module 180 and/or the web server 184.

The method 400 may end following either block 420 or 430.

Figure 5:
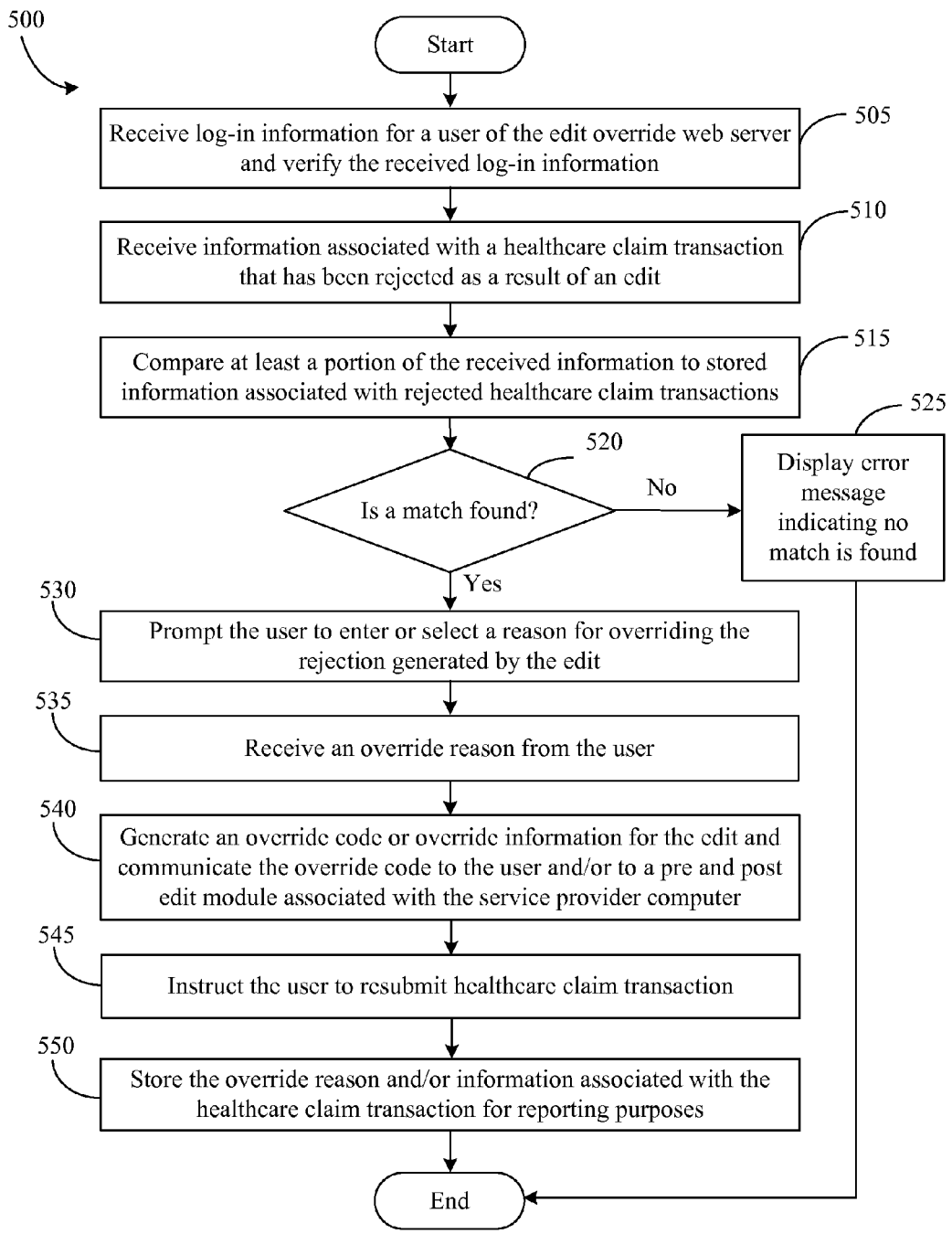
FIG. 5 is a flow chart of an example method for receiving a reason to override a rejection of a healthcare claim transaction, according to an illustrative embodiment of the invention.

FIG. 5 is a flow chart of an example method 500 for receiving a reason to override a rejection of a healthcare claim transaction, according to an illustrative embodiment of the invention. The method 500 illustrated in FIG. 5 may be an example implementation of block 315 shown in FIG. 3. As such, the method 500 may be performed by a suitable service provider computer and/or edit override module, such as the service provider computer 106 and/or edit override module 180 illustrated in FIG. 1. Additionally, the method 500 may be performed by utilizing an appropriate edit override web server associated with the edit override module 180, such as the web server 184 shown in FIG. 1. The method 500 may begin at block 505.

At block 505, log-in information may be received from a user of the edit override web server 184 and the received log-in information may be verified. For example, an employee of a healthcare provider may utilize a healthcare provider computer, such as the healthcare provider computer 104 shown in FIG. 1, to access the edit override web server 184. Upon accessing the web server 184, the employee as a user may be presented with a prompt for log-in information, such as a user name and password, and the user may provide the requested log-in information. The log-in information may then be verified or validated by the web server 184. If the log-in information is determined to be invalid, then an appropriate message indicating a failed log-in may be presented to the user. If, however, the log-in information is determined to be valid, then operations may continue at block 510.

At block 510, information associated with a healthcare claim transaction that has been rejected by an edit may be received from the user by the web server 184. The user may provide a wide variety of information associated with a healthcare claim transaction to the web server 184, including but not limited to, a primary card provider identifier, a healthcare provider identifier, an NPI code, a prescription number or other identifier associated with the healthcare claim transaction, and/or a date of service. At block 515, at least a portion of the received information may be compared to stored information that is associated with rejected healthcare claim transactions. For example, stored information for rejected healthcare claim transactions submitted by the healthcare provider computer 104 may be accessed and compared to the received information. As desired, the received information and/or the stored information may be normalized to facilitate the comparison.

At block 520, a determination may be made as to whether there is a match found between the received information and the stored information. If it is determined at block 520 that no match is found, then operations may continue at block 525 and an appropriate error message indicating that no match is found may be presented to the user. The user may then be prompted to reenter information and operations may continue at block 510. Alternatively, the method 500 may end. If, however, it is determined at block 525 that a match is found, then operations may continue at block 530.

As an alternative to receiving identifying information for a healthcare claim transaction, a user may be presented with a list of healthcare claim transactions that were submitted by the healthcare provider computer 104 and rejected by an edit. The user may select an appropriate healthcare claim transaction from the presented list. For security and confidentiality, a presented list may be limited to include only those healthcare claim transactions that were rejected during a certain time period (e.g., the last 5 minutes, 10 minutes, etc.) and/or those healthcare claim transactions that were submitted by the user that is logged into the web server 184.

At block 530, the user may be prompted to enter or select a reason for overriding the rejection that was generated by the edit. For example, the user may be presented with information associated with the healthcare claim transaction and/or the edit. The user may also be presented with instructions to enter an override reason for the edit-based rejection in a text box or other field that is provided. Alternatively, the user may be instructed to select an override reason for the edit from a list of predefined override reasons. The user may enter or select an override reason, and the override reason may be received by the web server 184 at block 535.

At block 540, an override code or other override information may be generated for the edit. For example, a numeric or alphanumeric override code may be generated. In certain embodiments, the override code may be specific to the rejected healthcare claim transaction. The generated override information may then be communicated to the service provider computer 106 and/or to the healthcare provider computer 104. For example, the override information may be communicated to a PPE module associated with the service provider computer 106, such as the PPE module 156 shown in FIG. 1. In other embodiments, the override information may be stored in a suitable memory that is accessible by the PPE module 156 and/or the service provider computer 106.

At block 545, which may be optional in certain embodiments of the invention, the user may be instructed to resubmit the healthcare claim transaction. Alternatively, the edit override module 180 may instruct the service provider computer 106 to reprocess the rejected healthcare claim transaction. During a reprocessing of the healthcare claim transaction, the generated override information may be utilized to suppress the edit and/or the rejection that is triggered or generated by the edit. In this regard, the healthcare claim transaction may be successfully processed by the service provider computer 106 and routed to an appropriate claims processor computer 108.

At block 550, information associated with the received override reason, the rejection, the edit, and/or the healthcare claim transaction may be stored for reporting purposes in one or more suitable memory devices associated with the edit override module 180, such as the databases 182 illustrated in FIG. 1. In this regard, one or more reports associated with the edit overrides may be generated.

The method 500 may end following either block 525 or 550.

Figure 6:
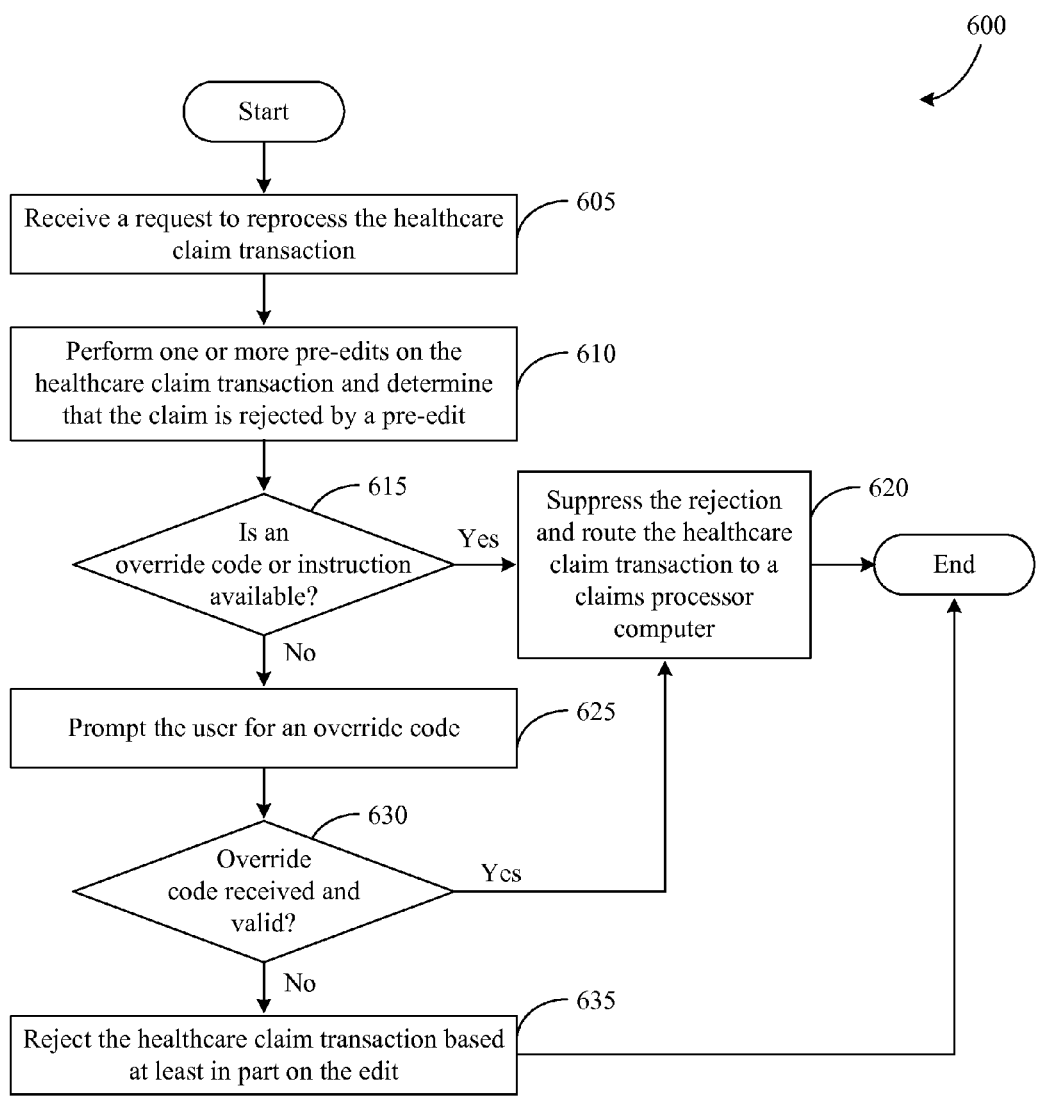
FIG. 6 is a flow chart of an example method for reprocessing a healthcare claim transaction that was previously rejected by an edit, according to an illustrative embodiment of the invention.

FIG. 6 is a flow chart of an example method 600 for reprocessing a healthcare claim transaction that was previously rejected by an edit, according to an illustrative embodiment of the invention. The method 600 illustrated in FIG. 6 may be an example implementation of block 325 shown in FIG. 3. As such, the method 600 may be performed by a suitable service provider computer and/or edit override module, such as the service provider computer 106 and/or edit override module 180 illustrated in FIG. 1. The method 600 may begin at block 605.

At block 605, a request to reprocess a previously rejected healthcare claim transaction may be received by the service provider computer 106. In some embodiments, the request may be received from the edit override module 180 and a previously rejected healthcare claim transaction may be reprocesses. As desired, a copy of the healthcare claim transaction may additionally be received from the edit override module 180 along with the request. In other embodiments, the healthcare provider computer 104 may resubmit the previously rejected healthcare claim transaction.

At block 610, one or more pre-edits may be performed on the reprocessed healthcare claim transactions and a determination may be made that the healthcare claim transaction is rejected as a result of a pre-edit that is performed. For example, one or more pre-edits may be performed by a suitable PPE module associated with the service provider computer 106, such as the PPE module 156 shown in FIG. 1. A rejection that is triggered by one of the pre-edits may then be identified. At block 615, a determination may be made as to whether any override information, such as an override code or override instruction, is available. For example, a determination may be made as to whether override information is included with the reprocessed healthcare claim transaction or available in a memory accessible by the PPE module 156 and/or the healthcare provider computer 106. If it is determined at block 615 that override information is available, then operations may continue at block 620 and the edit-based rejection may be suppressed or overridden. The reprocessed healthcare claim transaction may then be routed to an appropriate claims processor computer for adjudication, such as the claims processor computer 108 shown in FIG. 1.

If, however, it is determined at block 615 that no override information is available, then operations may continue at block 625, which may be optional in certain embodiments of the invention. At block 625, a request or prompt for an override code or other override information may be communicated to the healthcare provider computer 104. A user of the healthcare provider computer 104 may enter an override code, such as an override code provided to the healthcare provider computer 104 by the edit override module 180, and the override code may be received by the service provider computer 106. A determination may then be made at block 630 as to whether the received override code is a valid override code for the edit-based rejection. If it is determined at block 630 that the received override code is valid, then operations may continue at block 620 discussed above. If, however, it is determined at block 630 that the received override code is not valid, then operations may continue at block 635 and the reprocessed healthcare claim transaction may be rejected based at least in part on the rejection triggered by the edit.

As an alternative to rejecting a reprocessed healthcare claim transaction with a pre-edit and suppressing the rejection with override information, in certain embodiments of the invention, the pre-edit that rejects the healthcare claim transaction may be suppressed or bypassed based at least in part on the override information during the reprocessing of the healthcare claim transaction. Accordingly, a rejection of the reprocessed healthcare claim transaction may not be generated by the pre-edit.

The method 600 may end following either block 620 or 635.

The operations described and shown in the methods 300, 400, 500, 600 of FIGS. 3-6 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-6 may be performed.

Accordingly, example embodiments of the invention can provide the technical effects of creating a system, method, and apparatus that facilitate overriding rejections of healthcare claim transactions that have been rejected by one or more pre-edits performed on the healthcare claim transactions by a service provider that routes transactions between healthcare providers and claims processors. A web server may facilitate the receipt of reasons for overriding the edit-based rejections, and override information for the edit-based rejections may be generated such that the edit-based rejections will be suppressed when the healthcare claim transactions are reprocessed.

Various block and/or flow diagrams of systems, methods, apparatuses, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:
    receiving, by a service provider system comprising one or more computers, from a healthcare provider computer, a healthcare claim transaction;
    performing, by the service provider system, at least one edit on the received healthcare claim transaction;
    identifying, by the service provider system, a rejection for the healthcare claim transaction based at least in part on performing the at least one edit;
    communicating, by the service provider system to the healthcare provider computer, a message comprising an indication that the healthcare claim transaction has been rejected as a result of the at least one edit;
    receiving, by the service provider system from the healthcare provider computer, an indication of a reason for overriding the rejection;
    generating, by the service provider system and based at least in part on receiving the indication of the reason, override information associated with the rejection; and
    reprocessing, by the service provider system, the healthcare claim transaction, wherein the reprocessing comprises:
        performing the at least one edit on the healthcare claim transaction or on a resubmission of the healthcare claim transaction, and
        utilizing the override information to override the rejection.

2. The computer-implemented method of claim 1, wherein the message further comprises an invitation to access a web server for receiving input indicative of the reason for overriding the rejection of the healthcare claim transaction.

3. The computer-implemented method of claim 2, wherein the message further comprises a link to the web server.

4. The computer-implemented method of claim 1, further comprising:
    storing information associated with the identified rejection and the rejected healthcare claim transaction.

5. The computer-implemented method of claim 4, further comprising:
    receiving, by the service provider system from the healthcare provider computer via a web server, identifying information for the rejected healthcare claim transaction;
    comparing, by the service provider system, at least a portion of the received identifying information to at least a portion of the stored information; and
    communicating, by the service provider system and based at least in part on the comparing, a prompt for the reason for overriding the rejection.

6. The computer-implemented method of claim 1, wherein reprocessing comprises performing the at least one edit on the resubmission of the healthcare claim transaction, the method further comprising:
    receiving, by the service provider system from the healthcare provider computer, the resubmission of the healthcare transaction.

7. The computer-implemented method of claim 1, wherein generating override information comprises generating an override code for the rejection.

8. The computer-implemented method of claim 1, further comprising:
    communicating, by the service provider system, the generated override information to the healthcare provider computer.

9. The computer-implemented method of claim 1, further comprising:
    communicating, by the service provider system to the healthcare provider computer subsequent to generating the override information, an instruction to resubmit the healthcare claim transaction.

10. The computer-implemented method of claim 1, further comprising:
    generating, by the service provider system, a report comprising information associated with the rejection and the reason for overriding the rejection.

11. A system, comprising:
    at least one memory operable to store computer-executable instructions; and
    at least one processor configured to access the at least one memory and execute the computer-executable instructions to:
        receive a healthcare claim transaction from a healthcare provider computer;
        perform at least one edit on the received healthcare claim transaction;
        identify a rejection for the healthcare claim transaction based at least in part on the performance of the at least one edit;
        communicate, to the healthcare provider computer, a message comprising an indication that the healthcare claim transaction has been rejected as a result of the at least one edit;
        receive, from the healthcare provider computer, an indication of a reason for overriding the rejection;

generate, based at least in part on the reason for overriding the rejection, override information associated with the rejection; and reprocess the healthcare claim transaction, wherein, to reprocess the healthcare claim transaction, the at least one processor is configured to execute the computer-executable instructions to:

perform the at least one edit on the healthcare claim transaction or on a resubmission of the healthcare claim transaction, and utilize the override information to override the rejection.

12. The system of claim 11, wherein the message further comprises an invitation to access a web server for receiving input indicative of the reason for overriding the rejection of the healthcare claim transaction.

13. The system of claim 12, wherein the message further comprises a link to the web server.

14. The system of claim 11, wherein the at least one processor is further operable to execute the computer-executable instructions to:

store information associated with the identified rejection and the rejected healthcare claim transaction.

15. The system of claim 14, the at least one processor is further operable to execute the computer-executable instructions to:

receive, via a web server from the healthcare provider computer, identifying information for the rejected healthcare claim transaction;

compare at least a portion of the received identifying information to at least a portion of the stored information; and communicate, based at least in part on the comparison, a prompt for the reason for overriding the rejection.

16. The system of claim 11, wherein, to reprocess the healthcare claim transaction, the at least one processor is operable to execute the computer-executable instructions to perform the at least one edit on the resubmission of the healthcare claim transaction, and wherein the at least one processor is further operable to execute the computer-executable instructions to:

receive, from the healthcare provider computer, the resubmission of the healthcare transaction.

17. The system of claim 11, wherein the generated override information comprises an override code for the rejection.

18. The system of claim 11, wherein the at least one processor is further operable to execute the computer-executable instructions to:

communicate the generated override information to the healthcare provider computer.

19. The system of claim 11, wherein the at least one processor is further operable to execute the computer-executable instructions to:

communicate, to the healthcare provider computer subsequent to generating the override information, an instruction to resubmit the healthcare claim transaction.

\* \* \* \* \*